Dec. 4, 1923.
W. H. BROWN
1,476,440
VEHICLE SPRING SHACKLE AND MEANS FOR LUBRICATING SAME
Filed Nov. 21, 1919
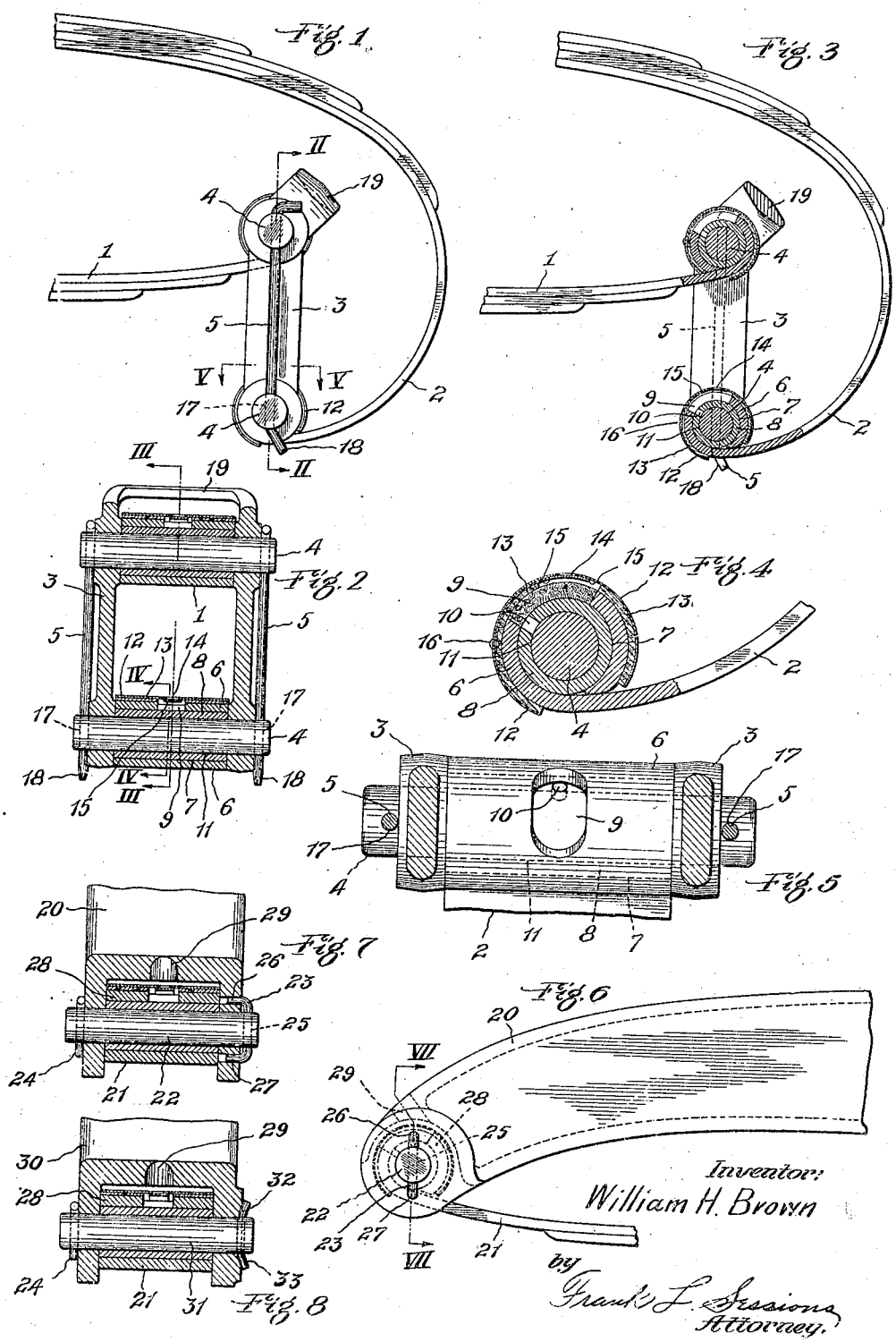
Inventor:
William H. Brown
by
Frank L. Sessions
Attorney.

Patented Dec. 4, 1923.

1,476,440

UNITED STATES PATENT OFFICE.

WILLIAM H. BROWN, OF CLEVELAND, OHIO.

VEHICLE SPRING SHACKLE AND MEANS FOR LUBRICATING SAME.

Application filed November 21, 1919. Serial No. 339,626.

*To all whom it may concern:*

Be it known that I, WILLIAM H. BROWN, a citizen of the United States, residing at Cleveland, in the county of Cuyahoga and State of Ohio, have invented certain new and useful Improvements in Vehicle Spring Shackles and Means for Lubricating Same, of which the following is a specification.

My invention relates to vehicle spring shackles such as are used to connect the ends of leaf springs to the vehicles which they support or to connect the ends of upper and lower members of combinations of leaf springs used in vehicle construction.

Among the objects of my invention are the provision of a new and improved construction of spring shackle; the provision of a spring shackle of simplified and inexpensive construction; the provision of a spring shackle in which the bolts are secured by a single means against longitudinal displacement and against rotation; the provision of new and improved means for lubricating the shackle bolts; and the provision of means for excluding dust and dirt from the bolt or pin bearing of the shackle.

The preferred embodiment of my invention is described in the following specification and shown in the accompanying drawings in which—

Fig. 1 is a side view of a pair of spring members connected by a spring shackle in accordance with my invention;

Fig. 2 is a section on line II—II of Fig. 1;

Fig. 3 is a section on line III—III of Fig. 2;

Fig. 4 is a section on line IV—IV of Fig. 2;

Fig. 5 is an enlarged section on line V—V of Fig. 1, the spring metal cover being omitted;

Fig. 6 is a side elevation of the front end of an automobile frame and front spring provided with my improved means for lubricating the spring bolt;

Fig. 7 is a section on line VII—VII of Fig. 6; and

Fig. 8 is similar to Fig. 7, with the exception of a change in the locking pin.

Referring to the drawings 1 represents a semi-elliptic spring and 2 a quarter elliptic spring which are joined together by a spring shackle composed of the link member, 3, bolts 4, 4, and locking pins 5, 5. The end of each of the leaf springs is formed into a cylindrical lug in and about which are incorporated means for lubricating the shackle bolt. 6 represents a cylindrical lug formed at the end of the leaf spring, 2. As this is typical of my preferred construction a description of it will suffice for any of the spring ends shown in the drawings.

The cylindrical lug, 6, has an eye, 7, extending through it which is preferably provided with a bearing bushing, 8, having a driving fit in the eye, 7, and which bushing may for the purposes of this description be considered as an integral part of the lug, 6. In the wall of the lug, 6, preferably on the upper side thereof there is formed an aperture, 9, connected by an opening, such as 10, to the hole, 11, in bushing, 8, the inner surface of which hole forms a bearing for the bolt or pin, 4. A cover, 12, preferably of spring metal is provided for the aperture, 9, and when in place upon lug, 6, forms together with the walls of the aperture, 9, an oil compartment. The metal cover, 12, is preferably provided with a lining, 13, of cork or other resilient, joint sealing material. An oil hole, 14, opening into the aperture, 9, is provided in the cover, 12. I prefer that the oil hole, 14, be normally closed by a spring closure, such as that shown at 15, which is secured to the cover, 12, by means of a rivet, 16.

The cover, 12, is preferably placed upon the lug, 6, by sliding it axially thereupon but it may be sprung over the lug from the side thereof if desired. It should be observed that the cover, 12, encompasses more than half of the circumference of the lug, 6, so that it is self retained thereon.

The shackle bolts, 4, extend through the eyes of the links and spring and are provided with transverse holes, 17. The transverse holes in each bolt are spaced apart so as to just clear the sides of the adjacent links and through these holes are inserted the locking pins, 5, which, after they are inserted may have their ends bent slightly as shown at 18 to prevent them from working out of place.

One of the locking pin holes, 17, in each of the shackle bolts, 4, is in alignment with one of the corresponding locking pin holes in the other of the shackle bolts. It will be seen that the locking pins, 5, secure the bolts, 4, against longitudinal displacement and also against rotation so that all of the wear on the shackle bolt occurs where it contacts with the spring lug, 6, or its bearing bushing, 8, when such bushing is used.

The two side members of the shackle link, 3, may be joined together by a cross bar, 19, or any other means if desired.

In order that dirt and foreign matter may be kept away from the bearing surface of the shackle bolts I prefer to fill the oil compartment, 9, with fibrous material as seen in Fig. 4. This may be of felt or of cotton or wool waste or other material. It not only strains the oil and prevents abrasive material from being carried into the bearing therewith but it also, by capillary attraction, restrains the oil from feeding too rapidly into the bearing thereby economizing oil.

In Figs. 6 and 7, 20 represents the front end of an automobile frame and 21 the front spring. As there is but one spring bolt employed to connect the spring, 21, to the frame, 20, it is necessary to modify the means for retaining the spring bolt, 22, in place and preventing its rotation. I prefer to accomplish this by means of a U shaped pin, 23, and the cotter, 24. The U shaped pin fits in a transverse hole, 25, in the bolt, 22, and the ends, 26 and 27, of the pin, 23, enter holes which are provided in the metal of the frame, 20, and which are located at diametrically opposite points adjacent to the bolt, 22. It will be seen that the pin, 23, prevents the rotation of the bolt, 22, and also prevents its longitudinal movement in one direction while the pin, 24, prevents the longitudinal displacement of the bolt in the other direction.

The spring lug, 28, is provided with a lubricating means like that shown in Fig. 4 and described in these specifications. An oil hole, 29, is preferably provided in the frame, 20, above the oil compartment in the spring lug to permit the insertion of the nose of an oil can.

Fig. 8 shows a construction similar to that shown in Fig. 7 with the exception that instead of the provision of drilled or punched holes for the reception of the bent ends of the locking pin as seen at 26 and 27, there is formed in the metal of the frame member, 30, a slot which extends across the bolt hole and receives the ends, 32 and 33, of a locking pin. If the slot be formed by a circular milling cutter so as to have a curved bottom, a straight pin may be inserted in the transverse hole in bolt, 31, and bent to conform to the curvature of the slot before the bolt is inserted into the eyes of the frame or shackle and spring, and will hold the bolt against turning and against longitudinal movement in one direction after it is in place. It will be understood that the bolt and locking pins shown in Figs. 6, 7 and 8, may be used for connecting the spring to a shackle as well as to the vehicle frame.

Among the advantages of my invention are simplicity and low cost; the avoidance of projecting grease or oil cups which are apt to be damaged or broken; the avoidance of all screw threads particularly those of grease cup caps which soon wear out or become crossed and rendered inoperative from frequent use; the avoidance of oil holes which have to be drilled in the shackle bolts, and which weaken the bolts, when grease or oil cups are mounted on the ends of the bolts; the avoidance of projecting lugs upon the shackle links or frame of the automobile to prevent the rotation of the shackle bolts; and the economy of oil. These and other advantages will be apparent to those who have the care of vehicles as well as to those skilled in the art.

Having thus described my invention, I claim:—

1. In vehicle construction the combination with a leaf spring having a lug at the end thereof, said lug having a bolt hole extending through it, of a spring shackle having a link on either side of said spring, one of the eyes of each of said links being in alignment with the hole in said spring lug, and a bolt passing through said eyes of said links and the hole in said spring lug, said spring lug having a transverse aperture exposing the side of said bolt, and a cover for said aperture closely encompassing said lug and provided with an oil hole.

2. In vehicle construction the combination with a leaf spring having a lug at the end thereof, said lug having a bolt hole extending through it, of a spring shackle having a link on either side of said spring, one of the eyes of each of said links being in alignment with the hole in said spring lug, a bolt passing through said eyes of said links and the hole in said spring lug, said spring lug having a transverse aperture exposing the side of said bolt, fibrous material in said aperture, and a cover for said aperture provided with an oil hole.

3. In vehicle construction the combination with a leaf spring having a transverse cylindrical lug at the end thereof, said lug having a shackle bolt hole extending through it and a transverse aperture from the periphery of said lug opening into said bolt hole, of a cylindrical cover for said aperture fitting said cylindrical lug and encompassing more than half of the circumference thereof thereby forming with the walls of said aperture an oil compartment, said cover having an oil hole opening into said oil compartment.

4. In vehicle construction the combination with a leaf spring having a transverse cylindrical lug at the end thereof, said lug having a shackle bolt hole extending through it and an aperture in its side connecting with said hole, of a spring metal cover for said aperture fitting over said cylindrical lug and closely encompassing more than half the circumference thereof, said cover having an oil hole opening into said aperture.

5. In vehicle construction the combination with a leaf spring having a lug at the end thereof, said lug having a bolt hole extending through it, of a spring shackle having a link on either side of said spring, one of the eyes of each of said links being in alignment with the hole in said spring lug, a bolt passing through said eyes of said links and the hole in said spring lug, said spring lug having a transverse aperture exposing the side of said bolt, fibrous material in said aperture, a cover for said aperture provided with an oil hole, and means for securing said bolt against longitudinal displacement, said means being also adapted to prevent the rotation of said bolt in said eyes of said links.

In testimony whereof I affix my signature.

WILLIAM H. BROWN.